United States Patent [19]
Lewis

[11] 4,198,748
[45] Apr. 22, 1980

[54] HYDRAULICALLY ACTUATED GARDEN TOOL
[75] Inventor: John B. Lewis, Paradise, Calif.
[73] Assignee: C.M.T. Tool, Paradise, Calif.
[21] Appl. No.: 932,204
[22] Filed: Aug. 9, 1978
[51] Int. Cl.² ............................................ B26B 17/00
[52] U.S. Cl. ...................................... 30/180; 30/241; 56/11.9
[58] Field of Search ................. 30/180, 228, 182, 241; 56/11.9, 335, 336, 337, 338

[56] References Cited
U.S. PATENT DOCUMENTS

| 3,087,295 | 4/1963 | Grupp | 56/11.9 |
|---|---|---|---|
| 3,476,015 | 11/1969 | Ackley | 30/228 X |
| 3,808,683 | 5/1974 | Hetherington | 30/228 |
| 3,922,782 | 12/1975 | Lind | 30/228 |

Primary Examiner—Jimmy C. Peters
Attorney, Agent, or Firm—Mark C. Jacobs

[57] ABSTRACT

A hydraulically actuated garden tool including a housing, a piston in the housing and a shaft connected to the piston extending out of the housing and terminating in a cutting blade. A guide is provided receiving the blade therein when the piston is actuated. A water inlet, controlled by a handle, is provided leading into the housing so that the introduction of water under pressure into the housing moves the piston, when the handle is actuated, to move the blade into the guide to cut a branch trapped therebetween.

12 Claims, 7 Drawing Figures

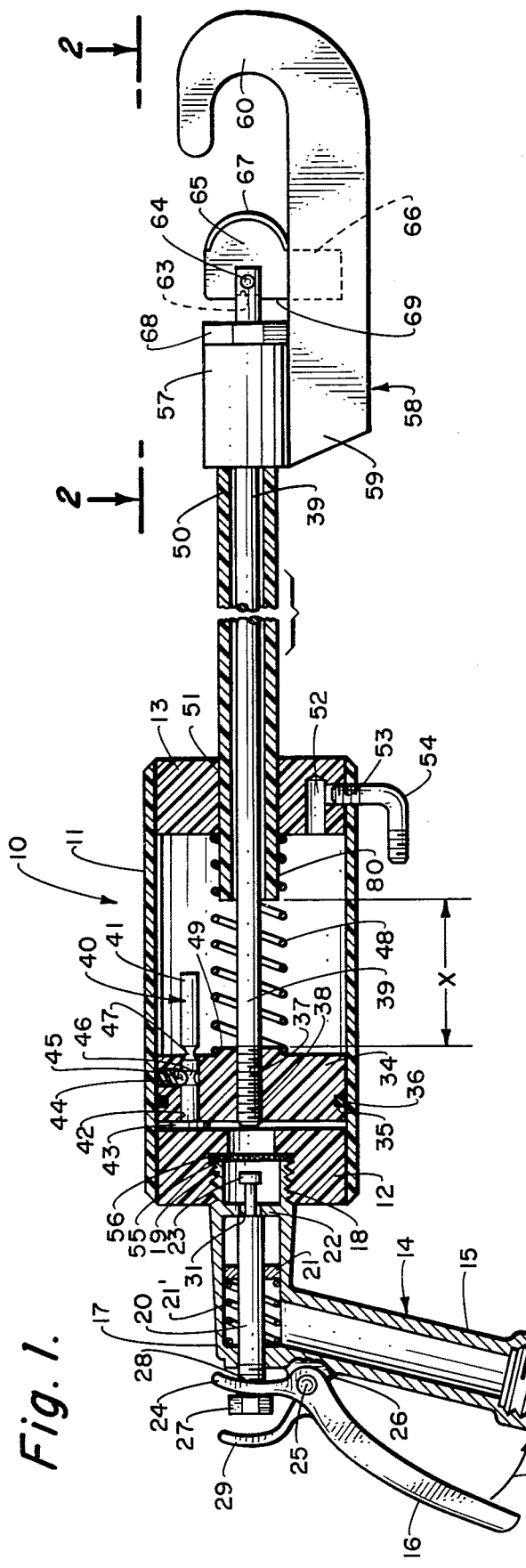
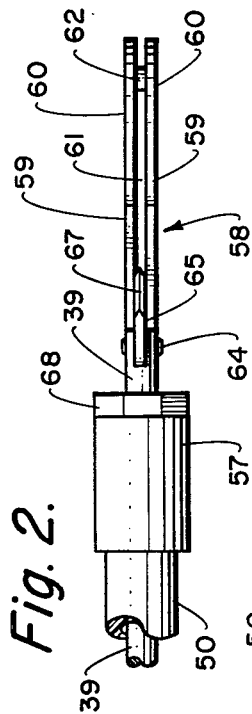
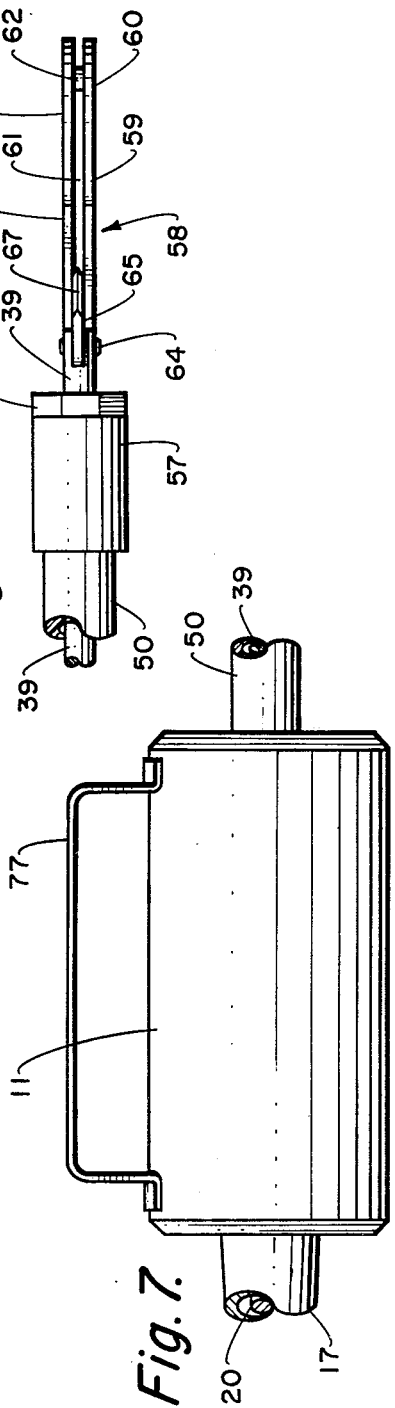

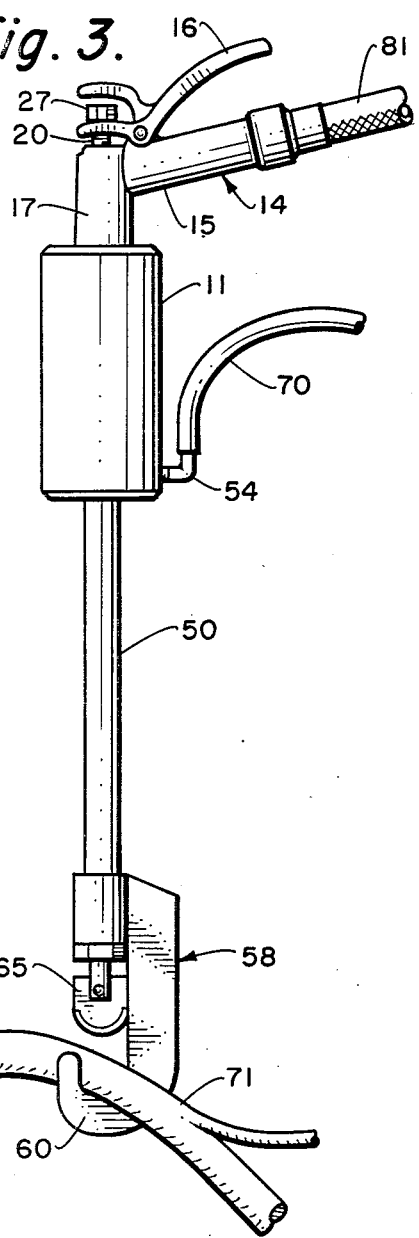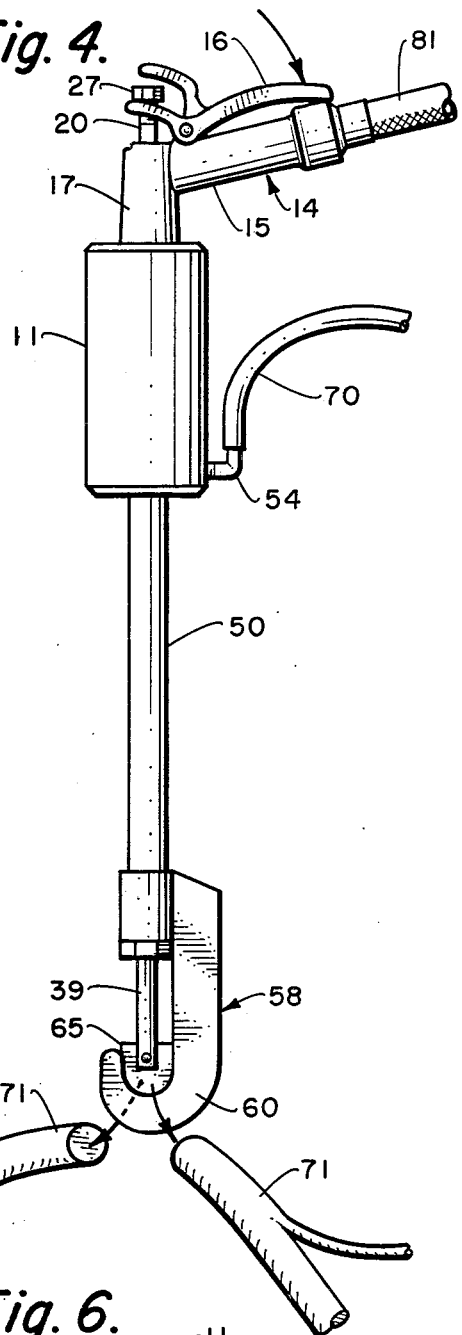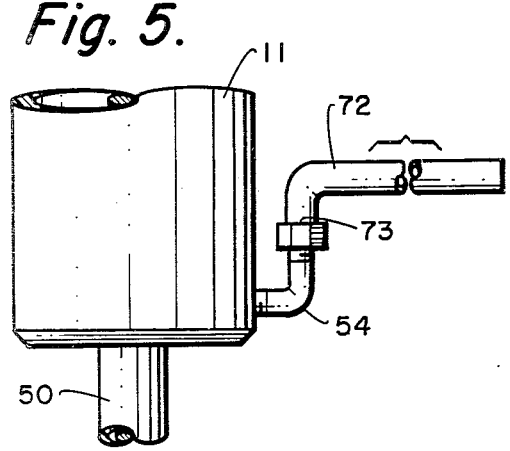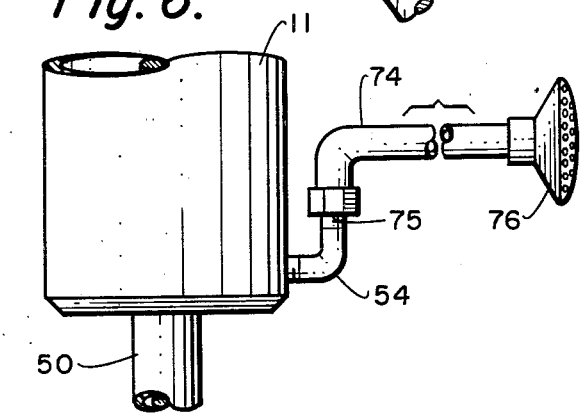

HYDRAULICALLY ACTUATED GARDEN TOOL

BACKGROUND OF THE INVENTION

1. Field of the Invention

The invention relates to garden tools; and, more particularly, to a hydraulically actuated tool which utilizes water under pressure from a garden hose to actuate a cutting element to thereby cut branches or the like.

2. Description of the Prior Art

Various types of garden tools are known for cutting branches or the like. Such tools do not work well on branche over a particular diameter. Other tools require a great forc to cut large diameter branches, such force being beyond that of many people, such as women and children. Still other branch cutting tools wear quickly or the blades are knocked out of alignment in attempting to cut branches over a certain diameter. All such tools require the grasping of a pair of handles to move two blades together to cut a branch between the blades.

There is a need for a branch cutting tool which can cut quickly and easily branches of a relatively large diameter. Such a tool should provide a force independent of that of the operator to effect such cutting.

SUMMARY OF THE INVENTION

It is an object of this invention to provide a hydraulically actuated branch cutting tool.

It is a further object of this invention to provide a cutting tool which can apply a cutting force to branches or the like independent of the strength of the operator.

It is still another object of this invention to provide a cutting tool which utilizes the ready availability of water pressure from a garden hose to cut branches or the like.

It is a further object of this invention to carry out the foregoing objects in an economical and inexpensive manner.

These objects and others are preferably accomplished by providing a housing having a piston therein, a piston shaft connected to the piston and a branch cutting blade at the end of the shaft. The blade is movable in a guide for receiving a branch between the guide and the blade. A water inlet is provided into the piston controlled by a hand grip. When water is introduced under pressure into the inlet and the hand grip is actuated, the blade is moved into contact with the guide to thereby cut a branch trapped therebetween.

BRIEF DESCRIPTION OF THE DRAWING

FIG. 1 is a vertical, partly cross-sectional, view of a hydraulically actuated garden tool in accordance with the invention;

FIG. 2 is a view taken along lines II—II of FIG. 1;

FIG. 3 is a perspective view of the tool of FIG. 1 about to be actuated to cut a branch;

FIG. 4 is a perspective view similar to FIG. 2 after actuation to cut the branch; and FIGS. 5 through 7 are vertical views of portions of the tool of FIG. 1 showing various modifications thereof.

DESCRIPTION OF THE PREFERRED EMBODIMENT

Referring to FIG. 1 of the drawing, a garden tool 10 is shown having a main housing 11 which may be cylindrical and sealed at each end by end walls 12,13. A conventional piston garden hose fitting 14 is provided having a fixed hand grip 15, a movable actuating lever 16 and a threaded portion 17 having threads 18 threadable into a threaded opening 19 in wall 12.

The interior of portion 17 is conventional having a piston shaft 20, a piston 21, a coil spring 21' normally biasing piston 21 to the right in FIG. 1, and end wall 22 with shaft 20 extending therethrough and terminating in an enlarged end 23. The other end of the shaft 20 extends out of portion 17 and through a slot in lever end 24 and terminates in a threaded nut 27 threaded on end 28 of shaft 20 so as to make the travel of shaft 20 adjustable. Lever 16 is pivotally connected via pivot pin 25 to a bracket 26 secured to grip 15 and portion 17. A stop flange 29 is fixedly secured to lever 16 and overlies nut 27.

It can be appreciated that moving lever 16 in the direction of arrow 30 moves lever end 24 in the opposite direction which pulls nut 27 and thus shaft 20 via piston 21 to move shaft 20 away from opening 31 in wall 22 to thus permit water introduced into grip 14 to exit out of opening 31 and into housing 11.

The foregoing has described a conventional pistol hose fitting well known in the art and which forms no particular part of my invention other than in the environment claimed. Obviously, other hose-type grips may be substituted, as long as fluid emitting therefrom can be controlled.

A conventional garden hose 81 having a threaded fitting 32 may be threaded into threaded opening 33 of hand grip 15.

End walls 12,13 and housing 11 may be of any suitable rigid material, such as polyvinyl chloride or the like. A piston 34, which may be any suitable material, such as nylon, is slidably mounted in housing 11 of a configuration, such as cylindrical, related to the inner configuration of housing 11. A peripheral groove 35 is provided on piston 34 for receiving a resilient O-ring 36 therein. Piston 34 has a centrally located threaded aperture 37 extending axially thereto for receiving the threaded end 38 of a rod 39. Rod 39 extends out of housing 11 in an axial direction as will be discussed. A bleed valve 40 is provided on piston 34 having a shaft 41 loosely disposed in an aperture 42 through piston 34 off-center from aperture 37. Shaft 41 terminates out of piston 34 in an enlarged head 43. Travel of valve 40 is limited by a spring 44 biasing a ball 45 selectively entering grooves 46,47 in shaft 41 as will be discussed. A coil spring 48 encircles rod 39 between piston 34 and end wall 13. Coil spring 48 encircles a boss 49 on piston 34 and guide rod 80 of housing 50 extending through end wall 13. Housing 50 may also be of any suitable rigid material, such as plastics, eg polyvinyl chloride. Housing 50 is preferably a tube cemented in opening 51 in end wall 13 and containing guiding rod 39 therein.

A port 52 is provided in end wall 13 communicating with both the interior of housing 11 and the exterior thereof. Portion 53 of port 52 may be internally threaded for receiving an elbow fitting 54 therein, for reasons to be discussed. Guide rod 50 is part of housing 80.

If desired, filter 55 may be provided in housing 11 and suitable seals, such as a washer 56 may be provided at end wall 11 at threads 18.

Housing rod 50 extends out of housing 11 and is threadably received in a sleeve or collar 57 of a branch receiving hook 58. Hook 58 includes an elongated portion 59 welded or otherwise secured to collar 57 extending away from housing 11 to a U-shaped hook portion 60. Plate 59,60 may be one-piece, if desired, or two abutted secured portions.

As shown in FIG. 2, portions 59,60 are comprised of two spaced sections forming a slot 61, the sections being retained in spaced relationship by spaced welds 62 or the like.

Rod 39 extends through housing 50 in collar 57 and, at its terminal end 63, has a cross-pin 64 in a suitable aperture therein extending through a like aperture in a branch cutting blade 65. Blade 65 includes an integral guide portion 66 adapted to ride in the slot 61 and a sharpened generally semi-circular end 67. As will be discussed, end 67 is adapted to move into the portion of slot 61 at hook portion 60 when tool 10 is actuated. Finally, a stop nut 68 is threaded onto the terminal end of housing 50 to provide a stop for the rear or non-cutting end 69 of blade 65.

In operation, as shown in FIG. 3, hose 81 is connected to grip 15 and a flexible hose 70 is connected to fitting 54 and may be of any suitable length and configuration. Hose 70 is used to deflect water away from tool 10 during operation. A tree branch 71 or the like is disposed in hook portion 60 in the path of travel of blade 65. The water is turned on and pistol grip fitting 14 is actuated, as heretofore described, which introduces water under pressure into housing 11 on the rear of piston 34 closing valve 40 (FIG. 1 position) and moving piston 34 against the bias of spring 48. This moves rod 39, coupled to piston 34, which, in turn, moves blade 65 in the slot 61 of hook portion 60 thus chopping off branch 71 caught between blade 65 and hook portion 60 (FIG. 4). Any water leakage past piston 34 flows out fitting 54 and through hose or tube 70 away from the operator. Release of lever 16 stops the flow of water to piston 34 and spring 48 biases piston 34 back to the FIG. 1 position. When the shaft 41 of valve 40 hits end wall 13, it opens the valve with ball 45 now entering groove 47 to stop the travel thereof. This permits spring 48 to bias piston 34 back to the FIG. 1 position. The extent of travel of piston 34 is shown as x in FIG. 1. Of course, piston 34 also abuts against rod 50 to stop its travel. Valve 40 of course closes when head 43 contacts end wall 12. Hose 70 may be coupled to housing 31, if desired. Fitting 54 may be turnable in any desired direction. In place of flexible tubing 70, a rigid tube 72 may be provided having a threaded end 73 threading on fitting 54 for directing the water in a predetermined direction toward or away from tool 10. Also, as shown in FIG. 6, a rigid spraying attachment 74 may be threaded via threaded end 75 to fitting 54 with water spraying out of sprayer 76 to disperse the excess water over a wide area. The amount and size of holes in sprayer 76 may be varied to give either a spraying or misting effect. Also, a handle 77 may be provided fixedly secured to housing 11 (or threaded in suitable threaded openings therein) to provide a grip for the operator and counterbalance the forces acting on tool 10. Handle 77 may also be foldable, if desired.

It can be seen that I have disclosed a tool which can be used to take advantage of the easy availability and tremendous force of water pressure to cut branches or twigs or the like. In fact, the tool of my invention can be actuated with only 30 pounds of pressure.

The design of this device includes several safety features, the most important of which is the fact that the combined portions 59, 60 act as a blade sheath to cover the exposed area of the blade during time of actuation. It is difficult for a finger to be severed or cut unless it is actually placed within the jaw of this hook-shaped sheath.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In a hydraulically actuated garden tool, fluid actuated branch cutting means adapted to be coupled to a source of water under pressure, conventional piston-actuated hose fitting having a grip and an internal spring-biased piston actuated by a handle on said grip coupled at one end to a hose connected to said source of water and having threaded means at the other end for quickly and easily coupling said piston-actuated hose fitting to said branch cutting means, said threaded means being in fluid communication with said hose with said piston controlling the flow of water from said hose through and out of said threaded means, said branch cutting means comprising:
a housing having threaded means at one end adapted to threadably engage the threaded means on said hose fitting and provide fluid communication between both said threaded means;
a reciprocal piston mounted in said housing;
a shaft fixed to said reciprocal piston extending out of one end of said housing;
a water inlet in fluid communication with both the end of said reciprocal piston opposite said shaft and the threaded means in said housing;
a blade carried at the terminal end of said shaft; and
blade sheath means coupled to said shaft for receiving said blade therein when water is introduced into said housing via said housing threaded means under pressure and against said reciprocal piston to thereby reciprocate said reciprocal piston moving said blade into engagement with said sheath means thereby cutting any branches or the like disposed between said blade and sheath means.

2. In the tool of claim 1 wherein said sheath means comprise a hook formed of a pair of spaced curved interconnected plates, the space between said plates being slightly greater than the thickness of said blade for receiving said blade therebetween.

3. In the tool of claim 1 wherein said shaft is reciprocal in a housing rod fixedly secured to said first-mentioned housing, said sheath means being connected to said second housing.

4. In the tool of claim 1 including a water outlet in fluid communication with both the interior of said housing, on the side of said reciprocal piston having said shaft connected thereto, and the exterior of said housing.

5. In the tool of claim 4 including a flexible tubing connected to said water outlet extending away from said housing.

6. In the tool of claim 4 including a rigid tubing connected to said water outlet extending away from said housing.

7. In the tool of claim 6 including spraying means connected to the terminal end of said tubing for spraying water exiting thereout.

8. In the tool of claim 1 wherein said housing has spaced end walls, said reciprocal piston being reciprocal between said end walls, and biasing means surrounding said shaft between said reciprocal piston and the end wall having said shaft extending therethrough normally biasing said reciprocal piston toward the end wall having said water inlet therein.

9. In the tool of claim 8 including valving means extending through a throughpassage in said piston, said valving means being adapted to open said throughpassage when said valving means contacts said end wall having said shaft extending therethrough and to close said throughpassage when said valving means contacts said end wall having said water inlet therein.

10. In the tool of claim 9 wherein said valving means includes an elongated bolt slidably mounted in said throughpassage having an enlarged head on the side of said reciprocal piston adjacent the end wall having said water inlet therein and a body extending a predetermined distance out of said throughpassage toward said end wall having said shaft extending therethrough, said head of said bolt closing off said throughpassage when said head is in engagement with the end wall having said water inlet therein, and limiting means on both said reciprocal piston and said housing for limiting the extent of longitudinal movement of said bolt.

11. A hydraulically operated garden tool comprising a cutting means adapted to be coupled to a source of water under pressure, by a piston-actuated hose fitting, actuatable by a grip handle, said branch cutting means comprising:
- a housing having threaded means at one end adapted to threadably engage the threaded means on said hose fitting and provide fluid communication between both said threaded means;
- a reciprocal piston mounted in said housing;
- a shaft fixed to said reciprocal piston extending out of one end of said housing;
- a water inlet in fluid communication with both the end of said reciprocal piston opposite said shaft and the threaded means in said housing;
- a blade carried at the terminal end of said shaft;
- blade sheath means coupled to said shaft for receiving said blade therein when water is introduced into said housing via said housing threaded means under pressure and against said reciprocal piston to thereby reciprocate said reciprocal piston moving said blade into engagement with said sheath means thereby cutting any branches or the like disposed between said blade and said sheath means;
- a piston actuated hose fitting; and
- a grip with a handle, said piston having an internal spring-biased piston therein actuated by movement of said handle on said grip said fitting coupled at one end to a hose connected to said source of water and having threaded means at the other end for quickly and easily coupling said piston-actuated hose fitting to said branch cutting means, said threaded means being in fluid communication with said hose, and said piston controlling the flow of water from said hose through and out of said threaded means.

12. A hydraulically operated garden tool comprising in combination a fluid actuated branch cutting means adapted to be coupled to a source of water under pressure by a piston-actuated hose fitting, said branch cutting means comprising:
- a housing having threaded means at one end adapted to threadably engage the threaded means on said hose fitting and provide fluid communication between both said threaded means;
- a reciprocal piston mounted in said housing;
- a shaft fixed to said reciprocal piston extending out of one end of said housing;
- a water inlet in fluid communication with both the end of said reciprocal piston opposite said shaft and the threaded means in said housing;
- a blade carried at the terminal end of said shaft;
- blade sheath means coupled to said shaft for receiving said blade therein when water is introduced into said housing via said housing threaded means under pressure and against said reciprocal piston to thereby reciprocate said reciprocal piston moving said blade into engagement with said sheath means thereby cutting any branches or the like disposed between said blade and said sheath means;
- and a piston-actuated hose fitting, having an internal spring-biased piston actuated by an actuating means, said actuating means coupleable at one end to a hose connected to a source of water and having threaded means at the other end coupling said piston-actuated hose fitting to said branch cutting means, said threaded means being in fluid communication with said hose when so coupled, whereby said piston controls the flow of water from said hose through and out of said threaded means.

* * * * *